(12) United States Patent
Fanaswalla et al.

(10) Patent No.: US 8,838,056 B2
(45) Date of Patent: Sep. 16, 2014

(54) RECEIVER CIRCUIT

(75) Inventors: Mustansir Fanaswalla, Campbell, CA (US); Khaldoon S. Abugharbieh, San Jose, CA (US); David L. Ferguson, Campbell, CA (US)

(73) Assignee: Xilinx, Inc., San Jose, CA (US)

( * ) Notice: Subject to any disclaimer, the term of this patent is extended or adjusted under 35 U.S.C. 154(b) by 732 days.

(21) Appl. No.: 13/171,254

(22) Filed: Jun. 28, 2011

(65) Prior Publication Data

US 2013/0002410 A1    Jan. 3, 2013

(51) Int. Cl.
*H04B 1/06* (2006.01)
*H04B 7/00* (2006.01)
*H04L 27/08* (2006.01)
*H04B 1/10* (2006.01)

(52) U.S. Cl.
CPC ....................................... *H04B 1/10* (2013.01)
USPC .......................... 455/234.1; 455/266; 375/345

(58) Field of Classification Search
USPC ........ 455/230, 232.1, 234.1, 234.2, 266, 296; 375/345, 346
See application file for complete search history.

(56) References Cited

U.S. PATENT DOCUMENTS

| 7,184,466 | B1 | 2/2007 | Seemann et al. |
| 7,756,486 | B1 | 7/2010 | Tan et al. |
| 2002/0101641 | A1* | 8/2002 | Kurchuk ........................ 359/189 |
| 2002/0176482 | A1 | 11/2002 | Chien |
| 2003/0198280 | A1 | 10/2003 | Wang et al. |
| 2004/0239369 | A1 | 12/2004 | Hsu et al. |
| 2006/0030277 | A1 | 2/2006 | Cyr et al. |
| 2010/0216412 | A1 | 8/2010 | Rofougaran |
| 2010/0317312 | A1 | 12/2010 | Lee et al. |
| 2013/0252664 | A1* | 9/2013 | Haralabidis et al. ........ 455/552.1 |

FOREIGN PATENT DOCUMENTS

| EP | 1 742 374 A1 | 1/2007 |
| FR | 2 904 899 A1 | 2/2008 |
| WO | WO 97/41643 A1 | 11/1997 |
| WO | WO 01/74000 A1 | 10/2001 |

* cited by examiner

*Primary Examiner* — Nguyen Vo

(74) *Attorney, Agent, or Firm* — LeRoy D. Maunu

(57) ABSTRACT

A receiver circuit includes an analog front-end circuit, a first adaptation circuit, and a second adaptation circuit. A method operates the receiver circuit. The analog front-end circuit is configured to resolve an output signal from an input signal as a function of adjustable parameters. The first adaptation circuit is coupled to the analog front-end circuit and is configured to determine values of the adjustable parameters responsive to the output signal. The second adaptation circuit is coupled to the analog front-end circuit and to the first adaptation circuit. The second adaptation circuit is configured to adjust the values of the adjustable parameters responsive to one or more operating conditions of the receiver circuit. These operating conditions include a temperature and/or a power supply voltage of the receiver circuit.

19 Claims, 2 Drawing Sheets

RECEIVER CIRCUIT

FIELD OF THE INVENTION

One or more embodiments generally relate to receiver circuits for data communications, and more particularly to automatic compensation for analog receiver circuits.

BACKGROUND

For high-speed data communication, the communication channel attenuates and distorts the data communication. Various receiver circuits compensate for this attenuation and distortion to restore the fidelity of the data communication, but operating conditions influence the effectiveness of these receiver circuits. There is a general need to extend the effectiveness of receiver circuits to higher data rates.

SUMMARY

In one embodiment, a receiver circuit includes an analog front-end circuit, a first adaptation circuit, and a second adaptation circuit. The analog front-end circuit is configured to resolve an output signal from an input signal as a function of adjustable parameters. The first adaptation circuit is coupled to the analog front-end circuit and is configured to determine values of the adjustable parameters responsive to the output signal. The second adaptation circuit is coupled to the analog front-end circuit and to the first adaptation circuit. The second adaptation circuit is configured to adjust the values of the adjustable parameters responsive to one or more operating conditions of the receiver circuit. These operating conditions include a temperature and/or a power supply voltage of the receiver circuit.

In one embodiment, a receiver circuit includes an analog front-end circuit, a first adaptation circuit, and a second adaptation circuit. The analog front-end circuit is configured to resolve an output signal from an input signal as a function of adjustable parameters. The analog front-end circuit includes an amplifier providing a gain specified by an amplification parameter of the adjustable parameters, and the analog front-end circuit includes a decision feedback equalizer providing negative feedback specified by an equalization parameter of the adjustable parameters. The first adaptation circuit is coupled to the analog front-end circuit and is configured to determine values for the adjustable parameters responsive to an eye opening of the output signal. The second adaptation circuit is coupled to the analog front-end circuit and to the first adaptation circuit. The second adaptation circuit is configured to determine offsets for the adjustable parameters responsive to operating conditions that include a temperature and a power supply voltage of the receiver circuit. The analog front-end circuit is configured to set the adjustable parameters to the values respectively adjusted with the offsets.

In one embodiment, a method operates an analog front-end circuit. The analog front-end circuit resolves an output signal from an input signal based on adjustable parameters. A first set of offset values is determined for the adjustable parameters for each of multiple combinations of operating conditions. Each combination provides a characterization value for each of one or more operating conditions. The analog front-end circuit is operated in an ambient environment, including automatically selecting a second set of uncompensated values of the adjustable parameters as a function of an analysis of the output signal. An ambient value is measured for each operating condition in the ambient environment. An adjustment is automatically selected that includes the first set of offset values for one of the combinations, and this combination provides the characterization value for each operating condition that matches the ambient value for the operating condition. The operating of the analog front-end circuit is adjusted in the ambient environment, including adjusting the second set of uncompensated values with the first set of offset values from the adjustment.

It will be appreciated that other embodiments are set forth in the Detailed Description and Claims which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

Figure 1:
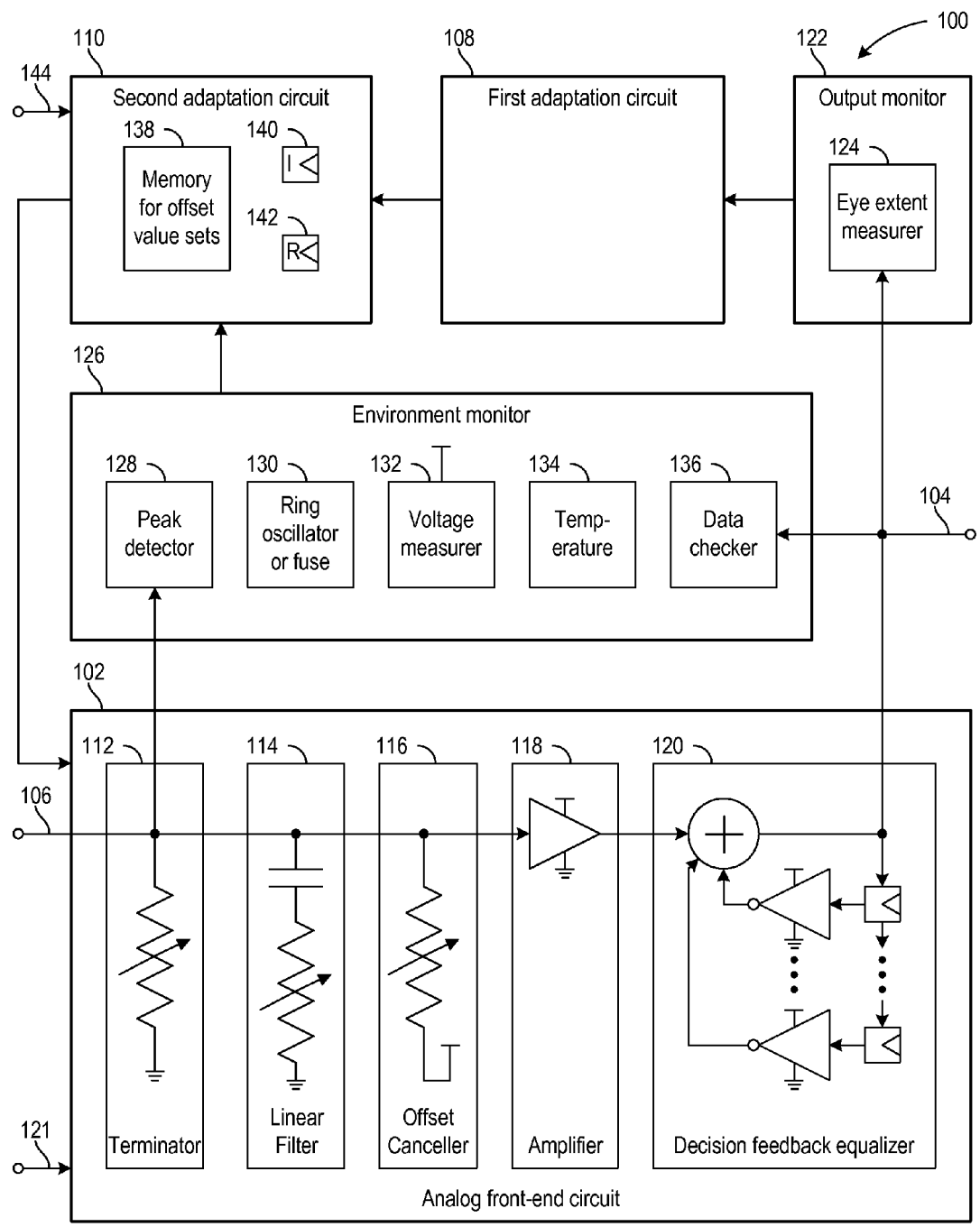
FIG. 1 is a block diagram of a receiver circuit that adjusts parameters of a receiver circuit based on operating conditions.

FIG. 1 is a block diagram of a receiver circuit 100 that adjusts parameters of an analog front-end circuit 102 based on operating conditions. The receiver circuit 100 includes an analog front-end circuit 102 configured to resolve an output signal on line 104 from an input signal on line 106 as a function of adjustable parameters of the analog front-end circuit 102. A first adaptation circuit 108 and a second adaptation circuit 110 select and adjust the values of the adjustable parameters to facilitate resolving the output signal on line 104 from the input signal on line 106.

In one embodiment, the analog front-end circuit 102 includes a terminator 112, a filter 114, an offset compensator 116, an amplifier 118, and a decision feedback equalizer 120 that have adjustable parameters selected to facilitate the performance of the analog front-end circuit 102.

The terminator 112 terminates the input signal on line 106. The terminator 112 provides a termination impedance varied by a termination parameter of the adjustable parameters. The termination impedance is variable to match the characteristic impedance of a transmission line of a communication channel connecting a remote transmitter to the input signal on line 106. A termination impedance that matches this characteristic impedance reduces reflections from an impedance imbalance at the receiver circuit 100. Reflections from receiver circuit 100 to the communication channel can return to receiver circuit 100 upon further reflections from other impedance imbalances in the communication channel or at the remote transmitter. Thus, terminator 112 improves signal fidelity by diminishing reflections.

The filter 114 emphasizes a high-frequency component of the input signal on line 106. The filter 114 provides a relative emphasis that is varied by an emphasis parameter of the adjustable parameters. In one embodiment, the filter 114 is a linear filter of passive components including a variable capacitance and a variable damping resistance. The filter 114 provides attenuation at frequencies below a corner frequency, and the time constant of the variable capacitance and the variable damping resistance sets this corner frequency. In another embodiment, the filter 114 is an active filter including amplification components. It will be appreciated that the adjustable parameters may specify the roll-off slope of the attenuation for either a passive filter or an active filter. A communication channel connecting a remote transmitter to the input signal on line 106 provides channel attenuation that generally increases with increasing frequency. The filter 114 improves signal fidelity by counteracting this frequency-dependent channel attenuation, even when the filter 114 is a passive filter with some insertion loss at all frequencies.

The offset compensator 116 balances the input signal on line 106. The offset compensator 116 provides an offset compensation varied by an offset parameter of the adjustable parameters. In one embodiment, the input signal on line 106 is a pair of differential signals and the amplifier 118 is a differential amplifier, and offset compensator 116 provides a variable bias between the differential signals to cancel a DC voltage bias between the differential signals. The offset compensator 116 keeps the common mode voltage of the input signal on line 106 centered within the range of linear amplification of amplifier 118. The offset compensator 116 improves signal fidelity by reducing distortion from amplifier 118 when the signal swing of the input signal on line 106 has unbalanced excursions outside the range of linear amplification of amplifier 118.

The amplifier 118 amplifies the input signal on line 106. The amplifier 118 provides a gain varied by an amplification parameter of the adjustable parameters. The amplifier 118 improves signal fidelity by counteracting attenuation in the communication channel connecting a remote transmitter to the input signal on line 106.

The decision feedback equalizer 120 equalizes the input signal on line 106. The decision feedback equalizer 120 provides negative feedback varied by an equalization parameter of the adjustable parameters. Various sources of signal distortion in the communication channel and the circuitry of the remote transmitter and the receiver circuit 100 cause inter-symbol interference. Inter-symbol interference distorts the level on each symbol received on line 106 with the levels of previously received symbols, especially the most recently received symbols. Decision feedback equalizer 120 subtracts the expected or measured distortion of the most recently received symbols. This negative feedback improves signal fidelity when the detected symbols match the symbols actually transmitted from the remote transmitter. In one embodiment, decision feedback equalizer 120 samples the most recently received symbols at active edges of a clock on line 121 recovered from the output signal on line 104.

In summary, the terminator 112, the filter 114, the offset compensator 116, the amplifier 118, and the decision feedback equalizer 120 improve the signal fidelity of the input signal on line 106 as a function of values of the adjustable parameters. This facilitates resolving the output signal on line 104 from the input signal on line 106 at higher data rates.

The first adaptation circuit 108 determines values of the adjustable parameters based on measurements of the output signal on line 104 by an output monitor 122. In one embodiment, the output monitor 122 includes a measurement circuit 124 that determines an extent of an eye opening of the output signal on line 104, and the first adaptation circuit 108 determines values of the adjustable parameters that improve the extent of the eye opening. For example, the first adaptation circuit 108 could increase the gain of amplifier 118 when the eye opening has insufficient height in signal amplitude.

The first adaptation circuit 108 determines values of the adjustable parameters that decrease distortion of the output signal on line 104. The communication channel and the circuitry of the remote transmitter and the receiver circuit 100 cause this distortion. Process, voltage, and temperature (PVT) variations in the receiver circuit 100 cause some of this distortion. However, these PVT variations affect the performance of the output monitor 122, and the first adaptation circuit 108 has a degraded capability to compensate for PVT variations based on measurements from an output monitor 122 affected by these PVT variations.

Because the first adaptation circuit 108 might not provide adequate compensation for such PVT variations across a wide range of types of communication channels, achieving adequate compensation may require restricting the possible types of communication channels supported by receiver circuit 100. In one example, the effects of PVT variations depend significantly on the run length of the symbols of the input signal on line 106, such that the first adaptation circuit 108 can achieve adequate compensation for PVT variations only for restricted run lengths. In another example, the effects of PVT variations depend significantly on the signal amplitude of the input signal on line 106, such that the first adaptation circuit 108 can achieve adequate compensation for PVT variations only for restricted signal amplitudes.

In addition, the desired performance of the receiver circuit 100 is a low bit-error rate (BER) in one embodiment. While the first adaptation circuit 108 might achieve a low BER with values of adjustable parameters providing a specified extent of the eye opening as measured by measurement circuit 124, an even lower BER might be achievable with values that further widen the extent of the eye opening. Thus, the first adaptation circuit 108 might select values of parameters that do not optimize the desired performance metric in this embodiment.

The second adaptation circuit 110 adjusts the values that the first adaptation circuit 108 selects for the adjustable parameters. The second adaptation circuit 110 adjusts these values based on one or more operating conditions of the receiver circuit 100. In one embodiment, an environment monitor 126 measures an ambient value for each operating condition of the ambient environment, and the second adaptation circuit 110 adjusts the values of the parameters based on the ambient values of the operating conditions. The second adaptation circuit 110 adjusts the values of the parameters to improve the performance of the receiver circuit 100 across a range of possible operating conditions. Thus, while the first adaptation circuit 108 might select values that provide excellent performance at nominal operation conditions, the second adaptation circuit 110 adjusts these values to extend excellent performance to a variety of possible operation conditions including extended run lengths and extended signal amplitudes.

In one embodiment, the environment monitor 126 includes a peak detection circuit 128, a process measurement circuit 130, a voltage measurement circuit 132, a temperature measurement circuit 134, and a data checking circuit 136. The peak detection circuit 128 measures the ambient value of the signal amplitude of the input signal on line 106. The process measurement circuit 130 measures the ambient value of a process speed of the analog front-end circuit 102. The process measurement circuit 130 is a ring oscillator measuring the process speed with the period of the ring oscillator in one embodiment, and the process measurement circuit 130 is one or more fuses programmed to indicate the characterized process speed of the receiver circuit 100 in another embodiment. The voltage measurement circuit 132 measures the ambient value of the power supply voltage of the analog front-end circuit 102. The temperature measurement circuit 134 measures the temperature of the analog front-end circuit 102. The data checking circuit 136 measures the ambient value of a data on the input signal on line 106. The data check circuit 136 is a data pattern checker in one embodiment and a run length detector in another embodiment.

In one embodiment, the second adaptation circuit 110 determines offsets for the adjustable parameters based on the ambient values of the operating conditions from environment monitor 126, and the analog front-end 102 sets its adjustable parameters to these offsets from the values selected by the first adaptation circuit 108. A memory 138 stores a set of potential offset values for each possible combination of the operating conditions. A characterization of a bit-error rate performance of the receiver circuit 100 generates the sets of potential offset values for the possible combinations of operating conditions in one embodiment. The second adaptation circuit 110 adjusts the values from the first adaptation circuit 108 with the set of offset values for the combination that matches the ambient values of the operating conditions.

In one embodiment, the second adaptation circuit 110 has two transitory initialization modes and a normal operating mode. During the first initialization mode, the second adaptation circuit 110 stores the adjustable parameters values from the first adaptation circuit 108 in an initialization register 140, and subsequently sets the adjustable parameters of the analog front-end circuit 102 to the values from the initialization register 140. Thus, the first adaptation circuit 108 sets the adjustable values of parameters based on a measurement of the output signal on line 104 during the first initialization mode.

During the second initialization mode, the second adaptation circuit 110 sets the adjustable parameters of the analog front-end 102 to an adjustment that offsets the values of parameters in the initialization register 140. This adjustment facilitates performance of the receiver circuit 100 at the current operation conditions. However, this adjustment generally changes the characteristics of the output signal on line 104, and the first adaptation circuit 108 may react to the changed characteristics by attempting to modify the adjustable parameters values. Because this attempted modification is a reaction subsequent to the second adaptation circuit 110 overriding the adjustable parameters values, and because this attempted modification is not a reaction to a change of the operating conditions during the transitory second initialization mode, the second adaptation circuit 110 prevents the attempted modification from reaching the analog front-end circuit 102. Instead, second adaptation circuit 110 stores the reactive modification of the values of parameters from the first adaptation circuit 108 in a reaction register 142. In summary, during the second initialization mode, the second adaptation circuit 110 adjusts the values of parameters of the analog front-end 102 and records the subsequent reaction of the first adaptation circuit 108 in the reaction register 142.

During the normal operating mode, the second adaptation circuit 110 maintains the adjustment of the values of parameters until a change in operation conditions causes the first adaptation circuit 108 to attempt to update the values from the baseline values stored in reaction register 142. After such a change in operating conditions, the second adaptation circuit 110 sets the adjustable parameters of the analog front-end 102 to a sum of the original adjustment of the parameters values and a difference between the reactive modification from the reaction register 142 and the update from the first adaptation circuit 108. Thus, the adjustable parameters of the analog front-end circuit 102 track changes in the operating conditions detected by the first adaptation circuit 108 from an analysis of the output signal on line 104 by the output monitor 122. However, these values of the parameters are adjusted with an offset determined during initialization from the initial operating conditions detected by environment monitor 126.

Registers 140 and 142 are clocked by the clock signal on line 144 that is derived from the recovered clock 121 in one embodiment and an independent clock in another embodiment.

Figure 2:
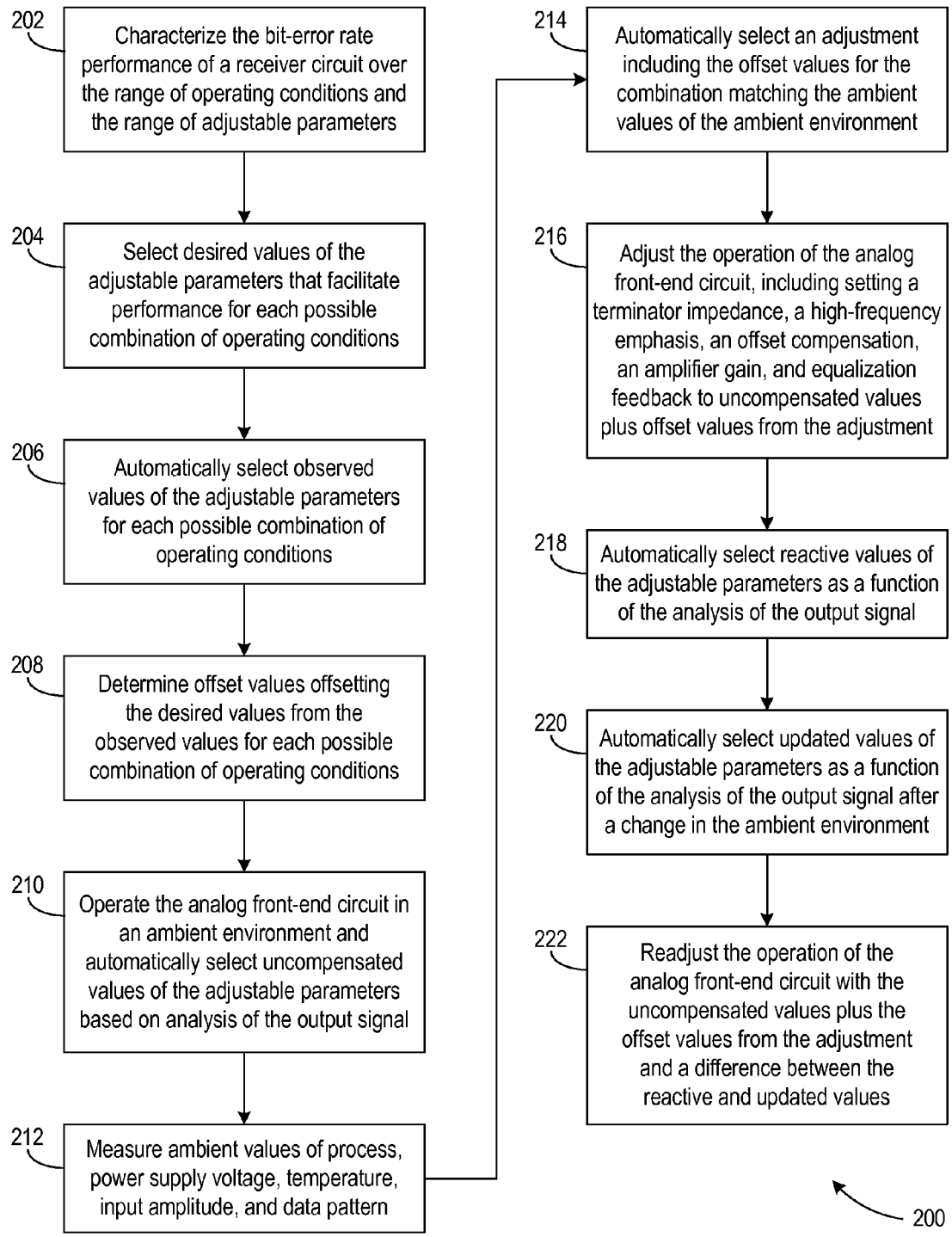
FIG. 2 is a flow diagram of process for adjusting parameters of a receiver circuit based on operating conditions.

FIG. 2 is a flow diagram of process 200 for adjusting parameters of a receiver circuit based on operating conditions. The receiver circuit is characterized over a variety of operation conditions, and the receiver circuit adjusts its values of parameters based on offsets determined from the characterization data.

At block 202, the bit-error rate performance of the receiver circuit is characterized over the range of possible operating conditions and the range of possible values of the adjustable parameters. This characterization may include fabricating receiver circuits that intentionally diverge from the desired semiconductor fabrication process to create receiver circuits with fast and slow process variations. These fast and slow receiver circuits are each tested with various power supply voltages spanning the supported power supply tolerance while these receiver circuits are cooled and heated to various operating temperatures. For each of these PVT combinations, the receiver circuits are tested with various communication channels transferring various data communication protocols at various signal amplitudes. The communication channels may include short and long channels having certain impedance discontinuities along the length of the communication channel. The data communication protocols may utilize various encodings having various run lengths, for example, 8B/10B, 64B/66B, or an initialization training sequence using a pseudo-random binary sequence.

The bit-error rate performance of the receiver circuit is characterized for each combination of the operating conditions of process, voltage, temperature, communication channel, data communication protocol, and signal amplitude. Each combination provides a characterization value for each operating condition. The bit-error rate performance of the receiver circuit is characterized for each combination at some or all of the possible values of the adjustable parameters. At block 204, a set of desired values of the adjustable parameters are selected that facilitates the bit-error rate performance of each combination. In one embodiment, the set of desired values for each combination is the set of values centered within those of the values of adjustable parameters that have an undetectable bit-error rate.

At block 206, a set of observed values of the adjustable parameters is automatically selected for each combination of each operating condition having each characterization value, and this set of observed values for each combination is automatically selected as a function of an analysis of the output signal. In one embodiment, an adaptation circuit automatically selects values of adjustable parameters based on an analysis of the output signal. A step of the characterization of each combination of possible operating conditions lets the adaptation circuit select the observed values applied to an analog front-end circuit of the receiver circuit.

At block 208, a set of offset values is determined for each combination of each operating condition having each characterization value. The set of offset values for each combination offsets the set of desired values for the combination from the set of observed values for the combination. In one embodiment, the offset value for each operating condition of each combination is the desired value for the operating condition in the respective set for the combination minus the observed value for the operation condition in the respective set for the combination. In this embodiment, the sets of offset values become a large table, and a table look-up gives the corresponding set of offset values for a particular operating condition. In another embodiment, linear or non-linear sensitivity coefficients are determined that give the set of offset values as a function of the possible operating conditions. In this embodiment, evaluation of a linear or non-linear function at a particular operating condition gives the corresponding set of offset values for the particular operating condition.

At block 210, the analog front-end circuit is operated in an ambient environment, and a set of uncompensated values of adjustable parameters is automatically selected as a function of the analysis of the output signal. In one embodiment, an adaptation circuit automatically selects values of adjustable parameters based on an analysis of the output signal.

At block 212, an ambient value is measured for each operating condition in the ambient environment. In one embodiment, the ambient values are measured for the operation conditions of the temperature of the analog front-end circuit, the power supply voltage of the analog front-end circuit, the process speed of the analog front-end circuit, the amplitude of the input signal of the analog front-end circuit, and the data pattern of the input signal of the analog front-end circuit.

At block 214, an adjustment is automatically selected that includes the set of offset values for one of the combinations providing a characterization value for each operating condition that matches the ambient value for the operating condition.

At block 216, the operation of the analog front-end circuit in the ambient environment is adjusted, including adjusting the set of uncompensated values with the set of offset values from the adjustment selected at block 214. In one embodiment, a terminator of the analog front-end circuit is set to an adjusted termination impedance, a filter of the analog front-end circuit is set to an adjusted relative emphasis of a high-frequency component of the input signal, an offset compensator is set to an adjusted offset compensation of the input signal, an amplifier of the analog front-end circuit is set to an adjusted gain for the input signal, and a decision feedback equalizer of the analog front-end circuit is set to an adjusted negative feedback for the input signal. The termination impedance is specified by a termination value equaling the uncompensated value of a termination parameter plus the offset value of the termination parameter. The relative emphasis is specified by an emphasis value equaling the uncompensated value of an emphasis parameter plus the offset value of the emphasis parameter. The offset compensation is specified by a compensation value equaling the uncompensated value of a compensation parameter plus the offset value of the compensation parameter. The gain is specified by an amplification value equaling the uncompensated value of an amplification parameter plus the offset value of the amplification parameter. The negative feedback is specified by an equalization value equaling the uncompensated value of an equalization parameter plus the offset value of the equalization parameter.

At block 218, a set of reactive values of the adjustable parameters are automatically selected as a function of the analysis of the output signal after adjusting the operating of the analog front-end circuit in the ambient environment at block 216 and before a subsequent change in the ambient environment. In one embodiment, an adaptation circuit automatically selects reactive values of the adjustable parameters based on an analysis of the output signal, but these reactive values are not applied to the analog front-end circuit.

At block 220, a set of updated values of the adjustable parameters are automatically selected as a function of the analysis of the output signal after the adjustment at block 216 and after the subsequent change in the ambient environment. In one embodiment, an adaptation circuit automatically selects updated values of the adjustable parameters based on an analysis of the output signal, but these updated values are not directly applied to the analog front-end circuit.

At block 222, the operating of the analog front-end circuit in the ambient environment is readjusted. The set of uncompensated values of the adjustable parameters is readjusted with the set of offset values from the adjustment at block 216 and a difference between the reactive values and updated values. Thus, the values of adjustable parameters track changes in the operating conditions between an initial analysis of the output signal at block 218 and the analysis of the output signal at block 220. However, these values are adjusted with an offset selected at block 214.

It will be appreciated that the process 200 of FIG. 2 begins on power-up initialization of a receiver circuit. In addition, the process 200 may begin again after each initialization of a communication link. Such initialization of a communication link can result from a forward error correction code or a cyclic redundancy check detecting an excessive bit error rate for the communication link. Thus, the offset values selected at block 214 may be reselected if environmental conditions change so much that an ongoing readjustment at block 222 no longer achieves an acceptable bit error rate.

The embodiments are thought to be applicable to a variety of systems for adjusting parameters for resolving an output signal from an input signal. Other aspects and embodiments will be apparent to those skilled in the art from consideration of the specification. The embodiments may be implemented as one or more processors configured to execute software, as an application specific integrated circuit (ASIC), or in programmable logic. It is intended that the specification and illustrated embodiments be considered as examples only, with a true scope and spirit of the invention being indicated by the following claims.

What is claimed is:

1. A receiver circuit, comprising:
   an analog front-end circuit configured to resolve an output signal from an input signal as a function of a plurality of adjustable parameters, the plurality of adjustable parameters including a termination parameter, an emphasis parameter, a compensation parameter, an amplification parameter, and an equalization parameter;
   a first adaptation circuit coupled to the analog front-end circuit and configured to determine a plurality of values of the plurality of adjustable parameters responsive to the output signal; and
   a second adaptation circuit coupled to the analog front-end circuit and to the first adaptation circuit, the second adaptation circuit configured to store the plurality of values of the plurality of adjustable parameters in a register and to adjust the plurality of values of the plurality of adjustable parameters responsive to at least one operating condition of the receiver circuit,
   wherein the at least one operating condition includes a temperature or a power supply voltage of the receiver circuit.

2. The receiver circuit of claim 1, wherein the analog front-end circuit includes:
   a terminator configured to terminate the input signal, the terminator providing a termination impedance that is variable in response to the termination parameter of the plurality of adjustable parameters;
   a filter configured to emphasize a high-frequency component of the input signal, the filter providing a relative emphasis that is variable in response to the emphasis parameter of the plurality of adjustable parameters;

an offset compensator configured to balance the input signal, the offset compensator providing an offset compensation that is variable in response to the compensation parameter of the plurality of adjustable parameters;

an amplifier configured to amplify the input signal, the amplifier providing a gain that is variable in response to the amplification parameter of the plurality of adjustable parameters; and a decision feedback equalizer configured to equalize the input signal, the decision feedback equalizer providing negative feedback that is a variable responsive to the equalization parameter of the plurality of adjustable parameters.

3. The receiver circuit of claim 1, wherein:

the second adaptation circuit is operable in a first, a second, and a third operating mode, the first and second operating modes being transitory initialization modes and the third operating mode being a normal operating mode;

during the first operating mode, the second adaptation circuit is configured to store the plurality of values from the first adaptation circuit in an initialization register, and subsequently set the plurality of adjustable parameters of the analog front-end circuit to the plurality of values from the initialization register;

during the second operating mode, the second adaptation circuit is configured to set the plurality of adjustable parameters of the analog front-end circuit to an adjustment of the plurality of values from the initialization register responsive to the at least one operating condition, and subsequently store a reactive modification of the plurality of values from the first adaptation circuit in a reaction register; and during the third operating mode, the second adaptation circuit is configured to set, after a change in the at least one operating condition, the plurality of adjustable parameters of the analog front-end circuit to a sum of the adjustment of the plurality of values and a difference between the reactive modification of the plurality of values from the reaction register and an update of the plurality of values from the first adaptation circuit.

4. The receiver circuit of claim 1, further comprising an output monitor configured to measure an extent of an eye opening of the output signal, wherein the first adaptation circuit is configured to determine, from the extent of the eye opening, the plurality of values that improve the eye opening of the output signal.

5. The receiver circuit of claim 1, further comprising an environment monitor configured to measure an ambient value for each of the at least one operating condition in the ambient environment, the environment monitor including:

a peak detection circuit configured to measure the ambient value of an amplitude of the input signal of the analog front-end circuit, the amplitude included in the at least one operating condition;

a process measurement circuit configured to measure the ambient value of a process speed of the analog front-end circuit, the process speed included in the at least one operating condition;

a voltage measurement circuit configured to measure the ambient value of the power supply voltage of the analog front-end circuit, the power supply voltage included in the at least one operating condition;

a temperature measurement circuit configured to measure the temperature of the analog front-end circuit, the temperature included in the at least one operating condition; and a data checking circuit configured to measure the ambient value of a data pattern of the input signal of the analog front-end circuit, the data pattern included in the at least one operating condition.

6. The receiver circuit of claim 5, wherein the process measurement circuit is at least one fuse programmed to indicate the process speed of the receiver circuit.

7. The receiver circuit of claim 1, further comprising:

a memory configured to store a set of offset values of the plurality of adjustable parameters for each of a plurality of combinations for the at least one operating condition; and wherein the second adaptation circuit is configured to adjust the plurality of values with the set of offset values for the combination that matches the at least one operating condition.

8. The receiver circuit of claim 7, wherein the memory is configured to store the set of offset values generated from a characterization of a bit-error rate performance of the receiver circuit over the plurality of combinations.

9. A receiver circuit, comprising:

an analog front-end circuit configured to resolve an output signal from an input signal as a function of values of a plurality of adjustable parameters, the plurality of adjustable parameters including a termination parameter, an emphasis parameter, a compensation parameter, an amplification parameter, and an equalization parameter;

wherein the analog front-end circuit includes an amplifier configured to provide a gain specified by an amplification parameter of the plurality of adjustable parameters;

wherein the analog front-end circuit further includes a decision feedback equalizer configured to provide negative feedback specified by an equalization parameter of the plurality of adjustable parameters;

a first adaptation circuit coupled to the analog front-end circuit and configured to determine a plurality of values for the plurality of adjustable parameters responsive to an eye opening of the output signal;

a second adaptation circuit coupled to the analog front-end circuit and to the first adaptation circuit, the second adaptation circuit configured to store the plurality of values of the plurality of adjustable parameters in a register and to determine a plurality of offsets for the plurality of adjustable parameters responsive to a plurality of operating conditions including a temperature and a power supply voltage of the receiver circuit; and wherein the analog front-end circuit is configured to set the plurality of adjustable parameters to the plurality of values respectively adjusted with the plurality of offsets.

10. The receiver circuit of claim 9, further comprising an output monitor configured to measure an extent of the eye opening of the output signal; and wherein the first adaptation circuit is configured to determine, from the extent of the eye opening, the plurality of values that improve the eye opening of the output signal.

11. The receiver circuit of claim 9, further comprising:

a memory configured to store a set of potential offsets of the plurality of adjustable parameters for each of a plurality of combinations for the plurality of operating conditions, the set of potential offsets for each combination being generated from a characterization of a bit-error rate performance of the receiver circuit for the combination; and wherein the second adaptation circuit is configured to determine the plurality of offsets that is the set of potential offsets for the combination that matches the plurality of operating conditions.

12. A method of operating an analog front-end circuit that resolves an output signal from an input signal based on values of a plurality of adjustable parameters, the method comprising:

determining a first set of offset values of the plurality of adjustable parameters for each of a plurality of combinations operating conditions, each combination providing a characterization value for each of at least one the operating conditions, the plurality of adjustable parameters including a termination parameter, an emphasis parameter, a compensation parameter, an amplification parameter, and an equalization parameter;

operating the analog front-end circuit in an ambient environment, including automatically selecting a second set of uncompensated values of the plurality of adjustable parameters as a function of an analysis of the output signal;

storing the uncompensated values of the plurality of adjustable parameters in a register;

measuring an ambient value for each of the at least one operating condition in the ambient environment;

automatically selecting an adjustment including the first set of offset values for one of the plurality of combinations providing the characterization value for each operating condition that matches the ambient value for the operating condition; and adjusting the operating of the analog front-end circuit in the ambient environment, including adjusting the second set of uncompensated values with the first set of offset values from the adjustment.

13. The method of claim 12, wherein the determining of the first set of offset values for each combination includes:

determining a third set of desired values of the plurality of adjustable parameters for each combination of the plurality of combinations, the third set of desired values facilitating a performance of the analog front-end circuit for the combination;

automatically selecting a fourth set of observed values of the plurality of adjustable parameters for each of the plurality of combinations as a function of the analysis of the output signal; and determining the first set of offset values for each combination of the plurality of combinations, the first set of offset values offsetting the third set of desired values for the combination from the fourth set of observed values for the combination.

14. The method of claim 12, wherein the determining of the first set of offset values for each combination includes:

characterizing a bit-error rate performance of the analog front-end circuit over a respective range for each of the at least one operating condition and each of the plurality of adjustable parameters;

selecting a third set of desired values of the plurality of adjustable parameters for each combination of each operating condition having each of a plurality of characterization values in the respective range for the operating condition, the third set of desired values facilitating the bit-error rate performance for the combination of the plurality of combinations;

automatically selecting a fourth set of observed values of the plurality of adjustable parameters for each combination of each operating condition having each characterization value as a function of the analysis of the output signal; and determining the first set of offset values for each combination of each operating condition having each characterization value, the first set of offset values for the combination offsetting the third set of desired values for the combination from the fourth set of observed values for the combination.

15. The method of claim 14, wherein the determining of the first set of offset values for each combination of each operating condition having each characterization value includes, for each operating condition, setting the offset value for the operating condition in the first set for the combination to the desired value for the operating condition in the third set for the combination minus the observed value for the operating condition in the fourth set for the combination.

16. The method of claim 12, wherein the measuring of the ambient value for each of the at least one operating condition in the ambient environment includes:

measuring the ambient value of a temperature of the analog front-end circuit, the temperature included in the at least one operating condition; and measuring the ambient value of a power supply voltage of the analog front-end circuit, the power supply voltage included in the at least one operating condition.

17. The method of claim 16, wherein the measuring of the ambient value for each of the at least one operating condition in the ambient environment further includes:

measuring the ambient value of a process speed of the analog front-end circuit, the process speed included in the at least one operating condition;

measuring the ambient value of an amplitude of the input signal of the analog front-end circuit, the amplitude included in the at least one operating condition; and measuring the ambient value of a data pattern of the input signal of the analog front-end circuit, the data pattern included in the at least one operating condition.

18. The method of claim 12, wherein the adjusting of the operating of the analog front-end circuit in the ambient environment includes:

setting a terminator of the analog front-end circuit to a termination impedance for the input signal, the termination impedance specified by a termination value of the termination parameter of the plurality of adjustable parameters, the termination value equaling the uncompensated value of the termination parameter in the second set plus the offset value of the termination parameter in the first set;

setting a filter of the analog front-end circuit to a relative emphasis of a high-frequency component of the input signal, the relative emphasis specified by an emphasis value of the emphasis parameter of the plurality of adjustable parameters, the emphasis value equaling the uncompensated value of the emphasis parameter in the second set plus the offset value of the emphasis parameter in the first set;

setting an offset compensator to an offset compensation of the input signal, the offset compensation specified by a compensation value of the compensation parameter of the plurality of adjustable parameters, the compensation value equaling the uncompensated value of the compensation parameter in the second set plus the offset value of the compensation parameter in the first set;

setting an amplifier of the analog front-end circuit to a gain for the input signal, the gain specified by an amplification value of the amplification parameter of the plurality of adjustable parameters, the amplification value equaling the uncompensated value of the amplification parameter in the second set plus the offset value of the amplification parameter in the first set; and setting a decision feedback equalizer of the analog front-end circuit to a negative feedback for the input signal, the negative feedback specified by an equalization value of the equalization parameter of the plurality of adjustable parameters, the equalization value equaling the uncompensated value of the equalization parameter in the second set plus the offset value of the equalization parameter in the first set.

19. The method of claim 12, further comprising:

automatically selecting a fifth set of reactive values of the plurality of adjustable parameters as a function of the analysis of the output signal after the adjusting of the operating of the analog front-end circuit in the ambient environment and before a subsequent change in the ambient environment;

automatically selecting a sixth set of updated values of the plurality of adjustable parameters as a function of the analysis of the output signal after the adjusting and the subsequent change in the ambient environment; and readjusting the operating of the analog front-end circuit in the ambient environment after the adjusting and the subsequent change in the ambient environment, including readjusting the second set of uncompensated values of the plurality of adjustable parameters with the first set of offset values from the adjustment and a difference between the fifth set of reactive values and the sixth set of updated values.

* * * * *